No. 874,650. PATENTED DEC. 24, 1907.
S. ANDERSON.
LUBRICATOR.
APPLICATION FILED JUNE 29, 1907.

WITNESSES:

Swan Anderson
INVENTOR

By C. A. Snow & Co.
ATTORNEYS

UNITED STATES PATENT OFFICE.

SWAN ANDERSON, OF OTTUMWA, IOWA.

LUBRICATOR.

No. 874,650.  Specification of Letters Patent.  Patented Dec. 24, 1907.

Application filed June 29, 1907. Serial No. 381,485.

*To all whom it may concern:*

Be it known that I, SWAN ANDERSON, a citizen of the United States, residing at Ottumwa, in the county of Wapello and State of Iowa, have invented a new and useful Lubricator, of which the following is a specification.

This invention has reference to improvements in lubricators, and its object is to produce a lubricator of the force-feed type adapted more particularly for use upon reciprocating or rotary parts, where the inertia of a movable part of the lubricator will tend to exert a pressure upon the lubricant to cause the same to flow as by force-feed to the part to be lubricated.

The invention has reference more particularly to a lubricator of the grease-cup type, wherein a heavy lubricant is used and force is necessary to cause its feeding to the journal or other part to be lubricated.

To this end, the invention comprises a suitable container in communication with the journal or other part to be lubricated, and within this container for the grease or other lubricant is arranged a plunger within a chamber the upper end of which is normally in communication with the external air through the interior of the plunger, which is provided with a hollow stem for the purpose; but which chamber, when the plunger approaches the outer end thereof after a certain extent of travel, is cut off from the external air and the confined air within said chamber operates as an elastic buffer for the plunger, thus preventing or greatly deadening the sound the plunger may make when brought to a standstill at the end of the chamber.

In addition to the force-feed features of the lubricator, there is provided a cap for carrying the plunger, which cap is held locked in place by a spring lock of particular construction, arranged to prevent the loosening of the cap under the conditions to which the lubricator is subjected in practical operation.

The invention will be fully understood from the following detailed description, taken in connection with the accompanying drawings forming part of this specification, in which,—

Figure 1:
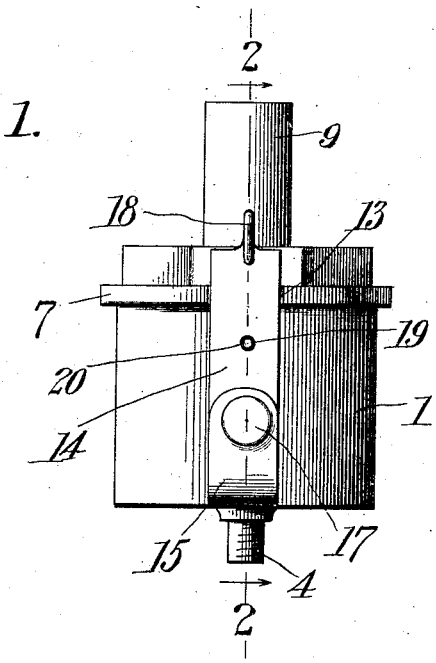
Figure 2:
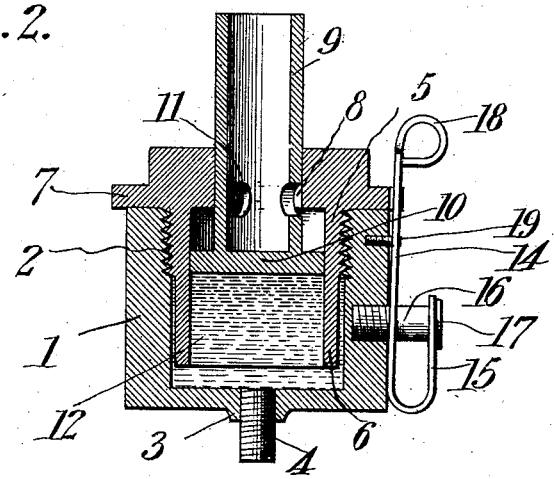

Figure 1 is a side elevation of the lubricator; and Fig. 2 is a vertical central section on the line 2—2 of Fig. 1.

Referring to the drawings, there is shown a cylindrical cup 1 which may be varied in size and shape as desired. The upper end of this cup is open and is internally threaded, as shown at 2, while at the bottom of the cup there is formed a central boss 3 receiving a screw nipple 4, the other end of which is also threaded for the application of the cup to a journal bearing or other part to receive the lubricant. Screwed into the upper end of the cup 1 is a hollow nut 5 having its walls extended beyond the threads of the nut, as shown at 6, and closing a plunger chamber, as will hereinafter appear. The nut is provided with a circumferential flange 7 arranged to be seated on the upper end of the cup 1 and, although not so shown, it will be understood that suitable packing may be interposed between the flange 7 and the upper end of the cup 1 should it be found either necessary or desirable. Above the flange 7 the nut may be polygonal for the reception of a wrench.

Centrally through the nut is a through opening 8 for receiving the hollow stem 9 of a plunger the head 10 of which is of such size as to fit snugly but easily in the interior of the chamber inclosed by the sleeve 6. Extending through the walls of the hollow stem 9 are a number of perforations 11 located at a distance away from the head 10.

Let it be assumed that the cup 1 contains an amount of grease, indicated at 12, or some other heavy lubricant, and that the lubricator is secured upon the journal bearing of a pitman connected to a crank, say, of an engine. And let it be assumed further that the grease is too heavy to flow spontaneously to the journal to be lubricated through the nipple 4. Now, when the crank is turning the cup 1 passes through a circular path and alternately falls and rises with relation to a horizontal plane. On that portion of the stroke during which the lubricator is passing downward the inertia of the plunger will cause the latter to move upward with relation to the cup 1 until ultimately the head 10 may come in contact with the upper end of the chamber inclosed by the sleeve 6. When the lubricator is moving upward the inertia of the plunger will cause the latter to move downward with relation to the cup and exert a force commensurate with its weight and the speed with which the lubricator travels, upon the grease within the cup and force a portion thereof out through the nipple 4 to the journal to be lubricated. When the plunger moves upward with relation to the cup its movement is unopposed because of the free communication of the air in the chamber inclosed by the sleeve 6 above the plunger with the open air through the perforations 11. But ultimately these perforations enter the passage 8 and are thereafter closed to the interior of the chamber above the head 10, and under these conditions the air so confined acts as a spring buffer for the plunger, or, allowing for a slight leakage around the stem 9, the confined air will act much like a dashpot. The result of this is that the head 10, if it comes into contact at all with the upper end of the chamber inclosed by the sleeve 6, will strike the same with but little momentum and produce a minimum of noise. Thus in practice the lubricator, although working by the relative reciprocation of the plunger, is practically silent.

Now, in order to maintain the nut or closure for the cup 1 in place, the flange 7 is provided with a recess 13 into which fits the upper end of a flat steel arm 14, which arm is bent into the shape of a U as indicated at 15, and is carried by a stud 16 screwed into or riveted in the cup 1 and having at its outer end a head 17 which prevents the shorter end of the U extension 15 from escaping from the stud 16. Both the free end of the extension U and the corresponding portion of the main body of the arm 14 are perforated for the passage of the stud 16. At the upper end the arm 14 is reduced in diameter and bent over to form a loop handle 18 by means of which the arm may be manipulated, and at a point between the stud 16 and the recess 13 there projects from the cup 1 a pin 19 normally entering a perforation 20 in the said arm 14.

The arm 14 is sufficiently resilient to be normally seated against the cup 1 with the perforation 20 receiving the pin 19 and the upper end of the arm below the handle 18 engaging in the recess 13. When, however, it is desirable to remove the closure of the cup, the arm 14 is bent against its resilient action until it is free from both the recess 13 and the pin 19, when it may be turned to one side around the stud 16 as an axis, after which the nut or closure of the cup may be unscrewed and the interior of the cup be thus exposed. When the nut or closure is again inserted in the cup and screwed home the arm 14 may be brought into coincidence with the recess 13 and the pin 19 be allowed to snap back into place, thus effectually locking the closure from accidental turning under the stress to which it is subjected in the operation of the machinery to which the lubricator is attached.

I claim:—

1. A lubricator comprising a suitable cup or container, and a loose plunger in said cup or container operating by inertia to exert pressure upon the lubricant to force the same from the container to the part to be lubricated, said cup coacting with the plunger to form an air cushion at that end of the cup remote from the end containing the lubricant.

2. A force-feed lubricator comprising a suitable cup, a closure for the same provided with a cylindrical extension, and a plunger contained and movable in said cylindrical extension and provided with a hollow guiding stem having perforations therethrough spaced a distance from the head of the plunger.

3. A force-feed lubricator comprising a cup having interior threads at its upper end, a closure provided with a threaded sleeve fitting the threads in the cup and extending therebeyond, and a plunger fitting the sleeve and having a hollow guiding stem extending to the exterior of the cup through the closure and provided with perforations spaced a distance from the head of the plunger.

4. A lubricator adapted for use upon moving parts, comprising a suitable cup, a closure for the same, a plunger having a relative movement with relation to the cup and acting by inertia to force the lubricant from the cup, and a spring catch for the closure comprising a spring arm hinged to one side of the cup and movable into and out of a recess in the closure.

In testimony that I claim the foregoing as my own, I have hereto affixed my signature in the presence of two witnesses.

SWAN ANDERSON.

Witnesses:
JEFFERSON R. McKAIG,
JOHN C. BOX.